United States Patent [19]

Fischer et al.

[11] Patent Number: 5,376,354
[45] Date of Patent: Dec. 27, 1994

[54] PROCESS FOR DISPOSAL OF WASTE BY COMBUSTION WITH OXYGEN

[75] Inventors: Reinhard Fischer, Aachen; Georg Menges, Aachen-Laurensberg, both of Germany

[73] Assignee: Noell Abfall-und Energietechnik GmbH, Neuss, Germany

[21] Appl. No.: 198,822

[22] Filed: Feb. 18, 1994

Related U.S. Application Data

[63] Continuation of Ser. No. 950,739, Sep. 24, 1992, abandoned, which is a continuation of Ser. No. 840,596, Feb. 19, 1992, abandoned, which is a continuation of Ser. No. 474,063, May 18, 1990, abandoned.

[30] Foreign Application Priority Data

| Oct. 16, 1987 | [DE] | Germany | 3735061 |
| Apr. 23, 1988 | [DE] | Germany | 3813817 |
| Oct. 15, 1988 | [EP] | European Pat. Off. | PCT/EP88/00927 |

[51] Int. Cl.$^5$ ................................. B09B 3/00
[52] U.S. Cl. .................... 423/659; 423/210.5; 423/DIG. 12; 588/205; 588/248; 110/236
[58] Field of Search ............... 423/184, 210.5, 659, 423/DIG. 12; 588/205, 208, 248; 110/236, 238

[56] References Cited

U.S. PATENT DOCUMENTS

| 3,642,583 | 2/1972 | Greenberg et al. | 203/11 |
| 4,198,201 | 4/1980 | Rohrbach | 432/13 |
| 4,338,870 | 7/1982 | Lanier, Jr. | 110/346 |
| 4,640,203 | 2/1987 | Wolter et al. | 110/346 |
| 4,658,736 | 4/1987 | Walter | 110/346 |
| 4,850,290 | 7/1989 | Benoit et al. | 110/346 |
| 4,917,027 | 4/1990 | Albertson et al. | 110/346 |
| 4,977,837 | 12/1990 | Roos et al. | 110/165 A |
| 5,008,098 | 4/1991 | Bernadiner | 423/659 |
| 5,179,902 | 1/1993 | Vojtech | 110/248 |

FOREIGN PATENT DOCUMENTS

| 0023642 | 2/1981 | European Pat. Off. . |
| 0103881 | 3/1984 | European Pat. Off. . |
| 0207924 | 1/1987 | European Pat. Off. . |
| 3617410 | 11/1987 | Germany . |
| 2169887 | 7/1986 | United Kingdom . |
| 8607602 | 12/1986 | WIPO . |

*Primary Examiner*—Gary P. Straub
*Assistant Examiner*—Timothy C. Vanoy
*Attorney, Agent, or Firm*—Cohen, Pontani, Lieberman, Pavane

[57] ABSTRACT

A process for the disposal of refuse is characterized by combustion of combustible, solid, pasty or liquid waste materials in a combustion plant with a combustion gas containing at least 50% oxygen. Combustible waste materials are burned in the presence of at least one material selected from the group consisting of non-ferrous metals, non-ferrous metal oxides, alkali compounds, and alkaline earth compounds. The aforementioned combustion is accomplished by burning materials which produce at least one material of the aforementioned class of materials together with the waste materials, by introducing at least one of the materials of the class into the combustion plant together with the input of waste materials or into the hot gas stream, or any combination of these which achieves a desired waste composition. The by-products of the process are cleaned flue gas and a slag in which hazardous materials present in the input waste material are mineralized.

23 Claims, No Drawings

PROCESS FOR DISPOSAL OF WASTE BY COMBUSTION WITH OXYGEN

CROSS-REFERENCE TO RELATED APPLICATIONS

This invention is a continuation of U.S. patent application Ser. No. 07/950,739 filed Sep. 24, 1992, now abandoned which is a continuation of U.S. Pat. Ser. No. 07/840,596 filed Feb. 19, 1992, now abandoned, which itself, in turn, is a continuation of U.S. Pat. Ser. No. 07/474,963 filed May 15, 1990, now abandoned.

BACKGROUND OF THE INVENTION

2. Field of the Invention

This invention relates generally to the disposal of municipal and industrial waste materials by combustion, in the presence of at least 50% oxygen and more particularly, to a process for waste combustion process which does not require separation of non-ferrous metals from the bulk waste material and which is adapted to simultaneously treat various combinations of the same.

2. Description of the Prior Art

In industries, households, and during the recycling of secondary substances, waste materials are produced which have a relatively high calorific value and which therefore present an opportunity to reduce the volume of waste by combustion. Such a reduction in the volume of waste would be desirable in order to prevent ground water contamination and to conserve landfill space. Processes for the combustion of municipal solid waste and other refuse using air are well known and need not be described here. A process for the incineration of combustible material, including municipal waste, in which the combustion air has an increased oxygen content, is described in published European Application EP-A 0207924. In that publication, the preferred oxygen content is 30–35% by weight, compared with the 23.19% by weight oxygen content of atmospheric air.

European Publication EP-A 0103881 deals with a process for the elimination of hazardous gaseous flue gas components. In that process, a cleaning is step is proposed in which lime or calcium carbonate is introduced into the flue gas downstream of the combustion furnace. For the same purpose, WO 86/07602 discloses that powdery additives of dicalcium-phosphate and ammonium chloride, with small contents of other chemicals, may be introduced into the combustion process. The WO/86/07602 reference, however, does not mention suitable ranges of temperatures.

In European Publication EP-A 0023642, there is proposed a mixture of red-slime with alkaline earth and aluminum hydroxide as adsorption matter. This mixture is introduced into a stream of waste gases at a temperature of approximately 300° C.

In British Publication GB-A 2,169,887, a process is disclosed in which pulverized alkali- or alkaline earth-oxides or carbonates thereof are blown into a combustion furnace at 800°–1000° C. Water or steam is separately injected into the flue gas.

In all combustion processes, waste gases occur which contain hazardous dust and also hazardous gaseous components. For example, hydrochloric acid arises from the combustion of polyvinyl chloride. Moreover, in bunting chlorinated or fluorinated hydrocarbons, dangerous chemical compounds can occur if special conditions of combustion are not observed and maintained.

For combustion with air, a greater amount of excess air is generally necessary for complete combustion to occur. Moreover, an after burning is essential for complete combustion because of the low temperature in the primary combustion chamber. Because the after burner needs additional fuel, the amount of waste gas is consequently increased. Accordingly, the heat recovery and gas cleaning installations are large and expensive. Additionally, although the concentration of pollutants in the cleaned gas is low, the overall emission level of hazardous substances is high because of the large volume of the gas stream.

It has already been proposed to improve the combustion by utilizing oxygen enriched air, for example, in the combustion of combustible residues from automobile shredders (Wilhelm C. Dries—Recycling Berlin 1979, S. 1447). A drastic reduction in the amount of waste gases occurs only if the combustion air contains at least 50% oxygen, but best results are obtained if pure oxygen with 99% $O_2$ is used for the combustion.

The magnitude of the reduction in the amount of waste gases is illustrated by the combustion of 1 kg of light oil. With an excess air value of 1.2, about 13 $Nm^3$ of flue gas is produced when the oil is combusted. In contrast, combustion of the same oil in pure oxygen produces only 3.2 $Nm^3$ of flue gas, a 75% reduction. Accordingly, the size and power consumption of the gas clean unit are substantially reduced.

A process for treatment of scrap batteries, as described in published German Patent Application P 36 17410.6, has been utilized for a long time. In that publication, it is disclosed that a complete and sootfree combustion of the plastic parts of batteries, as propylene and polyvinyl chloride, may be obtained if the materials are retained in the combustion furnace for a predetermined retention time.

Each of the aforementioned processes is limited in that it is adapted to treat only a portion of the components which are present in the overall waste stream.

SUMMARY OF THE INVENTION

The present invention comprises several steps by which refuse, especially plastic containing refuse, are burned with gases containing more than 50% oxygen to reduce the amount of flue gases, which means smaller gas cleaning units, lower power consumption, and reduced emissions of hazardous material and to increase the combustion temperature. The flue gas produced is cooled by a waste heat boiler and cleaned in a gas cleaning unit.

The theoretically possible very high combustion temperatures are reduced in practice to temperatures below 1800° C. either by reducing the calorific value of the input material or by recirculating part of the flue gas, which has already been cooled by the waste heat boiler, into the combustion chamber. Steam produced in the waste heat boiler may be utilized for any desired purpose, as for example, the purposes of the plant.

Metal containing materials are burned together with the other refuse, or the metal containing material or alkali or alkaline earth compounds are injected into the gas stream to combine with the hazardous materials.

The process according to the present invention is especially suitable for the disposal of discarded cars. The residues from the car shredder containing rubber, plastics, non-ferrous metals and the like, are incinerated with oxygen and, as mentioned above, the steam produced is used for purposes of the plant. Metal-compounds containing dust are recovered by a fabric filter and are subjected to metal recovery processes or are included into the slag which will be produced in the combustion furnace.

Accordingly, the present invention relates to a process for the disposal of refuse which is characterized by combustion of combustible, solid, pasty or liquid waste materials in a combustion plant with a combustion supporting gas that is not preheated and which contains at least 50% oxygen. The combustible waste materials are burned in the presence of at least one material selected from the class consisting of non-ferrous metals, non-ferrous metal oxides, alkali compounds, and alkaline earth compounds. The aforementioned combustion is accomplished by burning waste materials which produce at least one material of the aforementioned class of materials together with the waste materials, by introducing at least one of the materials of the class into the combustion plant together with the input of waste materials or into the hot gas stream, or by any combination of these which achieves a desired waste composition. If necessary, fluxes are added to the input material for controlling the composition of the slag.

The process of the present invention further includes reducing the temperature of the combustion chamber to the range of 1200°-1800° C. and cooling the flue gases. The cooling of the gases, for example, may be achieved by a waste heat boiler that recovers the waste heat. The process also includes removing dust from the flue gas using gas cleaning equipment and discharging non-combustible, non-volatile residues in the form of a molten liquid slag.

The combustion of waste materials, for example municipal solid waste, special hazardous waste, shredder residues, spent oil and others, is accomplished using a suitable furnace such as a rotary kiln. Preferably, the combustion supporting gas contains 70-80% oxygen, with a percentage of oxygen 98% or more being especially preferred. Examples of preferred non-ferrous metals, non-ferrous metal compounds and non-ferrous metal oxides are lead, zinc, tin, and copper, as well as the sulfates, carbonates, and oxides thereof. Examples of preferred alkali and alkaline earth compounds are carbonates, sulfates, hydroxides, and oxides of sodium, potassium, calcium, and magnesium. The quantity of non-ferrous metals or non-ferrous metal compounds or of alkali or alkaline earths and the compounds thereof are preferably controlled so that the overall halogen content, especially chlorine and fluorine, of the flue dusts is below 10%. The retention time of waste materials in the combustion plant furnace, especially in a rotary kiln, is at least one second.

The step of reducing the temperature recited above is performed by reducing the calorific value of the combustible waste material, recirculating flue gas that has already passed through and been cooled by the boiler, by direct or indirect cooling of the combustion chamber, or by any suitable combination of such steps.

As indicated, the cooling of the waste gases and the recovery of the waste heat contained therein is effected by a waste heat boiler, preferably by a waste heat boiler having a radiation heating surface and, more preferably, a waste heat boiler having a primary radiation heating surface. The steam of the waste heat boiler can be used for generating electrical power or for directly driving machines associated with the air separation plant or the shredder plant. The steam produced by the waste heat boiler can also be used to power other equipment of the waste combustion plant, or it can even be sold to third parties.

The various features of novelty which characterize the invention are pointed out with particularity in the claims annexed to and forming a part of the disclosure. For a better understanding of the invention, its operating advantages, and specific object attained by its use, reference should be had to the detailed description of the preferred embodiments which follows.

DETAILED DESCRIPTION OF THE PREFERRED EMBODIMENTS

The present invention offers a distinct advantage over waste combustion systems of the prior art. Specifically, there is no need to separate non-ferrous metals, in particular heavy metals, from the waste material. Rather, the presence of such material is utilized for combination with possibly present acids and other chemical compounds after converting the non-ferrous metals into oxides by combustion. Two different possibilities are presented in this regard, depending upon the composition of the input waste material. If the waste materials already contain a sufficient quantity of non-ferrous metals, or compounds or oxides thereof, or alkali/alkaline earth compounds, the quantity of these materials need not be adjusted. If however, the quantity of the aforementioned materials in the waste material to be disposed of is not sufficient, they may either be added to the input waste materials or introduced into the hot gas stream during combustion.

As mentioned, part of the flue gases can be recirculated into the combustion chamber after cooling by the waste heat boiler to reduce the temperature of the combustion chamber. The flue gases not recirculated in this manner are cleaned in a gas cleaning installation whereby the dust contained therein is removed. Preferably, the removal of the dust in the gas cleaning installation is effected by a fabric filter. If necessary, a high efficiency micro filter can be installed downstream of the normal filter. If the metal content of the dust removed by the filter(s) is high enough to be economically recovered, it may be utilized in a metal recovery process. If, however, the metal content is too low for metal recovery, the dust is re-introduced back into the combustion furnace either for enrichment or for inclusion into the slag produced therein.

The non-combustible, non-volatile residues of combustion are discharged as slag which has been liquified by suitable, known fluxes if necessary. Suitable materials are added to the input of waste material for formation of slag and for the mineralization of hazardous materials. Such fluxes are well known to metallurgists, and among those conventional flux materials which may be utilized are iron, lime, silica, and alumina.

The combustion of waste material with oxygen means that calorimetric flame temperatures of over 2000° C. can be reached at which hydrocarbons are no longer stable.

The hydrochloric, hydrofluoric, sulfuric acids or the like which may be produced during combustion of certain plastics can cause problems. It is, however, known from metallurgical processes that metal oxides are an excellent material to combine with such acids. This is especially the case if these metal oxides arise during combustion. For example, a flue dust with up to 10% chlorine as lead chloride is produced during the smelting of battery scrap. But other metal oxides, as for example zinc oxide, are also very suitable for combining with the chlorine.

If one or more suitable metal oxides are not present in sufficient amounts in the input waste material, or if they cannot be subsequently introduced into the gas stream by other methods, the combination of chlorine or fluorine with alkali or alkaline earth compounds injected into the gas stream is possible. In this regard, it is desirable to maintain contact between gas and dust as long as possible. One way in which to achieve adequate contact between the injected gas and the dust is to recycle the dust removed by the filter.

As indicated, the heat produced during combustion can be used to generate steam in a waste heat boiler. Waste heat boilers for utilizing latent heat contained in dusty gases are known. Special provisions have to be made for sticky flue dust containing chlorine or fluorine.

The present invention is especially suitable for plants which shred discarded automobiles. During shredding, combustible residues containing plastics, textiles, wood, rubber, and the like are generated. In accordance with the present invention, all of these residues can be burned in a suitable furnace at the shredder site. To the combustible residue, such a quantity of the non-magnetic portion of non-ferrous metals smaller than 25 mm are added so that sufficient metal oxides are present in the flue dust for combination with possibly present acids. Alternately, dust removed from the gas stream by the cleaning installation filter is recycled into the furnace. The metal content of the flue dust can be enriched by recycling metal containing flue dust into the combustion furnace, and metal therein can be subsequently recovered. Flue dust for which there is no utility can be recycled into the combustion furnace for incorporation into the slag. In this manner, hazardous materials are mineralized in the slag. Because of the high temperature of the combustion furnace, the solid residues are discharged as a molten, liquid slag. To enhance liquification of the slag and mineralization of hazardous materials therein, fluxing reagents can be added to the input waste material.

Combustion temperatures up to 2500° C. arise in the case of higher calorific values of the refuses as 8000 kJ/kg for example during combustion of shredder residue with about 15,000–18,000 kJ/kg and with an oxygen content of the combustion air over 50% because of the small quantity of flue gas thereof. The temperature of the combustion chamber can be reduced either by reduction of the calorific value of the input material or by recirculation of a certain portion of the flue gas after it has been cooled by the waste heat boiler. The recirculation of the flue gas is advantageous in that the quantity of flue gas to be cooled by the waste heat boiler increases while the amount of the waste gas to be cleaned and released, and thus the emission of pollutants therewith remains small.

The steam produced by the waste heat boiler may be utilized to generate electrical power for the operation of the plant delivered to third parties, or it may be used directly to drive machines of the air separation plant or of the shredder plant.

After the waste heat boiler, the portion of the flue gas which is not recycled into the combustion chamber will be cleaned by a gas cleaning unit, preferably by a fabric filter. Because of the comparatively small volume of flue gas and in the case of a special demand for high cleanliness of the waste gas, it may be desirable to install a high efficiency microfilter. Such a microfilter yields a dust content of the clean gas below 0.1 mg/Nm$^3$, if positioned downstream from a normal fabric filter, which reduces the dust content in the gas to below 5 mg/Nm$^3$.

A further special advantage of the invention is the fact that refuse of different origin, for example municipal solid waste, industrial waste, and hazardous refuse, can be burned simultaneously in the same combustion plant. Heretofore, it has been necessary to burn the aforementioned refuses separately. The following examples are illustrative of the process.

EXAMPLE 1

Combustion of Municipal Waste and Hazardous Waste in a Rotary Kiln

As indicated, a separation of municipal waste, industrial waste, and hazardous refuse is not necessary because the temperatures of the inside of the kiln and of the combustion exceeds 1200° C. and is preferably from 1500°–1800° C.

Waste is charged into the rotary kiln after coarse crushing. Liquid combustible refuses are injected by an oxygen burner. The combustion thereof acts as a support flame. Oxygen produced by an air separation plant is blown into the rotary kiln. An intermediate liquification is not necessary. Only one-third of flue gases are generated during combustion when compared with combustion with atmospheric air because the nitrogen ballast, 79% of the volume of the air, is missing.

Because flame temperature reaches over 2500° C. at combustion with oxygen, a sufficient volume of flue gases is recirculated into the combustion chamber after cooling in a heat exchanger (waste heat boiler) to provide an economical temperature within the combustion chamber. In this regard, combustion chamber temperatures over 1500° C. are tolerable with commercially available refractory materials.

Nitrogen oxides are only present in negligible amounts because air is only used for atomizing the liquid refuses and because only small quantities of air enters the system through leakage. Moreover, small quantities of nitrogen are contained in the plastics to be burned.

Suitable additions, for example, calcium hydrate, are added to the input waste material for combination with possibly arising halogens in the case where suitable compounds are not present, whether at all or in sufficient quantity, in the input waste material. These materials are burned simultaneously or injected into the hot gas stream. By addition of the additives into the hot zone very fast reaction rates can be achieved for combination with hazardous materials. The hot gases come into the waste heat boiler and a fraction of the flue gas is recirculated into the combustion chamber after cooling.

Because of the high temperature of the flue gases, a radiation heating surface is preferably installed ahead of the waste heat boiler. The radiation heating surface functions as a means for diverting the gas stream and as a baffle to eliminate flue slag. The cooled flue gases are dedusted by a fabric filter. Temperatures of 180°–250° C. are possible, depending on the filter material selected.

In accordance with presently available combustion processes, a typical waste gas volume of 5500 Nm$^3$ per ton of waste results in production of 82 500 Nm³ per hour for a plant with a capacity of 15 tons per hour of waste. Such operation yields a particle stream of 330 g/h that can be cleaned to a clean gas dust content of 4 mg/Nm³, using a good fabric filter. In contrast, by burning with oxygen in accordance with the present invention, the flue gas quantity to be cleaned is only 28 000 Nm³/h including leakage air. With the same clean gas content as above, a decrease of the stream of hazardous particles occurs of only 110 g/h. The hazardous particles eliminated by waste heat boiler and fabric filter are recycled into the rotary kiln and combined with the slag. A gas washing is not necessary because the halogens are combined with the additives.

Possibly necessary fluxes are added to the input material to discharge combustion residues and flue dust recycled as a liquid slag and to transform hazardous matters into water insoluble compounds by mineralization. The solidified slag can be deposited in a landfill or possibly used in some further process. Some of the heat energy recovered by the waste heat boiler can be used for the production of the necessary oxygen or can be delivered to other consumers.

| Layout data | | |
|---|---|---|
| Waste throughput | 15 | t/h |
| Calorific value | 11000 | kJ/kg |
| Humidity | 30 | % H₂O |
| Slag output | 4.5 | t/h |
| Oxygen consumption | 1 | kg O₂/kg waste |
| Rotary kiln | | |
| Dimension | 48 × 3,5 | m length/diameter |
| Quantity of flue gas | 15600 | Nm³/h |
| Flue gas recycled | 35000 | Nm³/h |
| Gas quantity entry w.h. boiler | 50600 | Nm³/h |
| Temperature | 1800 | °C. |
| O₂-plant | | |
| Capacity | 10500 | Nm³/h |
| Space | 40 × 50 | m |
| Power consumption | 4.9 | MW |
| Cooling water | 500 | m³/h |
| Waste heat boiler | | |
| Heating surface | 850 | m² |
| Steam produced | 54 | t/h |
| Steam pressure | 16 | bar |
| Fabric filter | | |
| Gas quantity | 28000 | Nm³/h |
| Entry temperature | 180 | °C. |
| Filter area | 800 | m² |
| Clean gas dust content | 5 | mg/Nm³ |

EXAMPLE 2

Combustion of Shredder Residue in a Rotary Kiln

This process is distinguished from the one of Example 1 only in the much higher calorific value than is associated with combustion of municipal solid waste and the like. Usually the shredder residue contains enough of the non-ferrous metals, which are respectively left in the material, to effect the necessary combination with the chlorine and fluorine also produced during combustion. An addition of alkali or alkaline earth is not necessary. Because of the high metal content of the shredder residue, there is presented an opportunity to recover the metal content of the flue dust removed by the fabric filter.

| Layout data | | |
|---|---|---|
| -continued | | |
| Shredder residue throughput | 5 | t/h |
| Calorific value | 15000 | kJ/kg |
| Humidity | 5 | % H₂O |
| Slag output | 1.75 | t/h |
| Oxygen consumption | 1.4 | kg O₂/kg waste |
| Rotary kiln | | |
| Dimension | 30 × 3.2 | m length/diameter |
| Quantity of flue gas | 4800 | Nm³/h |
| Flue gas recycled | 20300 | Nm³/h |
| Gas quantity entry w.h. boiler | 25100 | Nm³/h |
| Temperature | 1800 | °C. |
| O₂-plant | | |
| Capacity | 5000 | Nm³/h |
| Space | 30 × 20 | m |
| Power consumption | 2.4 | MW |
| Waste heat boiler | | |
| Heating surface | 430 | m² |
| Steam produced | 25 | t/h |
| Steam pressure | 16 | bar |
| Fabric filter | | |
| Gas quantity | 10000 | Nm³/h |
| Entry temperature | 180 | °C. |
| Filter area | 270 | m² |
| Clean gas dust content | 5 | mg/Nm³ |

As described above, tile present invention makes it possible to burn refuse from diverse sources, including metal containing materials, simultaneously in such a manner that the combustion products thereof are able to combine with hazardous materials which may be generated during combustion. After combustion, alkali or alkaline earth compounds can also be introduced into the gas stream for combination with such hazardous materials.

The waste gas can be cleaned, after cooling by a waste heat boiler, in a fabric filter with dust recycling within the filter or in another suitable equipment. Further, the flue gas exiting the waste heat boiler can be recirculated into the combustion chamber in such a quantity which is necessary to achieve the desired combustion chamber temperature. For example, at operation of a shredder plant the combustible fraction and a part or all non-ferrous-metal containing constituents of the discarded cars, after separation in the shredder plant, are put into an installation in which they are burned with a combustion gas which contains at least 50%, preferably 70 to 98% or more oxygen. The flue gas, after cooling by the waste heat boiler, will be cleaned in a suitable gas cleaning plant, preferably by a fabric filter, and the steam of the waste heat boiler will be used for an air separation plant or for the shredder plant. Some of the steam may also be used directly for the turbine drive of the shredder.

It should be understood that the preferred embodiments and examples described are for illustrative purposes only and are not to be construed as limiting the scope of the present invention which is properly delineated only in the appended claims.

What is claimed is:

1. A process for the disposal of raw waste material comprising: (a) combusting in a combustion chamber, without after burning, raw waste material with a combustion supporting gas which has not been pre-heated in the presence of an additive selected from the group consisting of non-ferrous metals, non-ferrous metal compounds, and non-ferrous oxides, to produce waste gases, flue dust and non-combustible, non-volatile liquid slag, said gas containing at least 50% oxygen and said combustion occurring at an associated temperature of combustion;

(b) cooling the waste gases produced during step (a) by recovering energy therefrom;

(c) reducing the temperature of combustion to the range of 1,200° C. to 1,800° C. by at least one of (i) lowering the calorific value of the waste material, (ii) recycling at least a part of the cooled waste gases from step (b), and (iii) cooling the combustion chamber;

(d) removing the flue dust from the waste gases; and (e) discharging the non-combustible non-volatile liquid slag, to produce a liquid containing mineralized hazardous materials.

2. The process according to claim 1, wherein the combustion chamber used in said combusting step is a rotary kiln.

3. The process according to claim 1, wherein said flue dust removing step comprises passing the waste gases through a fabric filter.

4. The process according to claim 1, wherein the retention time in the combustion chamber is at least one second.

5. The process according to claim 3, further including recycling at least a portion of the flue dust removed by the filter into the combustion chamber.

6. The process according to claim 5, wherein flue dust having less than a predetermined metal content is recycled during said recycling step and incorporated into the liquid slag.

7. The process according to claim 5, wherein flue dust having at least a predetermined metal content is recycled during said recycling step and is used to enrich the metal content in the flue dust.

8. The process according to claim 1, wherein raw waste material including household garbage, industrial waste, and hazardous refuse is simultaneously combusted during step (a).

9. The process according to claim 1, further including adding a slag-forming flux material comprising at least one of iron, lime, alumina, and silica to the raw waste material, to aid in the production of the liquid slag containing mineralized hazardous materials.

10. The process according to claim 1, wherein said cooling step includes recovering heat from the waste gases in a waste heat recovery boiler.

11. The process according to claim 10, wherein the waste heat boiler comprises a radiation-heating surface.

12. The process according to claim 10, wherein said waste heat boiler comprises an upstream radiation-heating surface.

13. The process according to claim 1, wherein the combustion gas contains from 70 to 98% oxygen.

14. The process according to claim 1, wherein the combustion gas contains more than 97% oxygen.

15. The process according to claim 1, further including the step of adding the additive selected from the group of materials to the raw waste material prior to combustion.

16. The process according to claim 1, wherein the non-ferrous metal material is selected from the group consisting of tin, lead, copper and zinc; and wherein said non-ferrous metal oxides are selected from the group consisting of oxides of tin, lead, copper, and zinc.

17. The process according to claim 1, wherein the material selected from the group of materials is present in amount effective to ensure that the flue dust contains no more than 10% of halogen.

18. The process according to claim 17, wherein said introducing step comprises introducing an effective amount of a material selected from the group so that the flue dust contains no more than 10% of halogen.

19. The process according to claim 1, wherein the additive is selected from the group consisting of alkali metal compounds and alkaline earth compounds.

20. The process for the disposal of raw waste material comprising:

(a) combusting in a combustion chamber, without after burning, raw waste material with a combustion supporting gas which has not been pre-heated to produce waste gases, flue dust and non-combustible, non-volatile liquid slag, said gas containing at least 50% oxygen and said combustion occurring at an associated temperature of combustion;

(b) introducing a additive selected from the group consisting of non-ferrous metals, non-ferrous metal compounds, and non-ferrous oxides into the waste gases;

(c) cooling the waste gases produced during step (a) by recovering energy therefrom;

(d) reducing the temperature of combustion to the range of 1,200° C. to 1,800° C. by at least one of (i) lowering the calorific value of the waste material, (ii) recycling at least a part of the cooled waste gases from step (b) and (iii) cooling the combustion chamber;

(e) removing the flue dust from the waste gases; and (f) discharging the non-combustible non-volatile liquid slag.

21. The process according to claim 20, wherein the additive is selected from the group consisting of alkali metal compounds and alkaline earth compounds.

22. A process for the disposal of raw waste material comprising the steps of:

(a) providing waste feed stock in the form of a solid, a paste or a liquid, said waste feed stock comprising said raw waste material;

(b) reacting the waste feed stock in the presence of a combustion supporting gas which has not been preheated, said gas containing at least 50% oxygen, to produce waste gases, flue dust and non-combustible, non-volatile liquid slag;

(c) controlling the composition of said waste feed stock so that said flue dust and said non-volatile liquid slag comprise one or more residual components selected from the group consisting of non-ferrous metals, non-ferrous metallic compounds, and non-ferrous metal oxides;

(d) reducing the temperature of the products within the combustion chamber to the range of 1,200° C.–1,800° C.;

(e) cooling the waste gases in a waste heat boiler and recovering energy from said waste heat boiler;

(f) removing the dust from said waste gases; and (g) discharging the non-combustible, non-volatile liquid-slag.

23. The process according to claim 22, wherein the components are alkaline earth compounds.

* * * * *